United States Patent
Vona et al.

(10) Patent No.: US 10,657,099 B1
(45) Date of Patent: May 19, 2020

(54) SYSTEMS AND METHODS FOR TRANSFORMATION AND ANALYSIS OF LOGFILE DATA

(71) Applicant: Dell Software Inc., Aliso Viejo, CA (US)

(72) Inventors: Geoffrey Vona, Toronto (CA); Yinghua Qin, Zhuhai (CN); Shengzhi Liu, Zhuhai (CN)

(73) Assignee: Quest Software Inc., Aliso Viejo, CA (US)

( * ) Notice: Subject to any disclaimer, the term of this patent is extended or adjusted under 35 U.S.C. 154(b) by 366 days.

(21) Appl. No.: 14/929,482

(22) Filed: Nov. 2, 2015

(51) Int. Cl.
*G06F 16/16* (2019.01)
*G06F 16/9535* (2019.01)
*G06F 16/245* (2019.01)
*G06F 16/182* (2019.01)

(52) U.S. Cl.
CPC .......... *G06F 16/168* (2019.01); *G06F 16/182* (2019.01); *G06F 16/245* (2019.01); *G06F 16/9535* (2019.01)

(58) Field of Classification Search
USPC ........................................................ 707/754
See application file for complete search history.

(56) References Cited

U.S. PATENT DOCUMENTS

| | | | |
|---|---|---|---|
| 7,225,368 B2 | 5/2007 | Lancaster | |
| 7,376,969 B1 * | 5/2008 | Njemanze | G06F 21/55 709/224 |
| 7,694,311 B2 | 4/2010 | Amir et al. | |
| 7,979,245 B1 | 7/2011 | Bourlatchkov et al. | |
| 8,175,863 B1 | 5/2012 | Ostermeyer et al. | |
| 2012/0143893 A1 | 6/2012 | Abraham | |
| 2012/0323941 A1 * | 12/2012 | Chkodrov | G06F 17/30516 707/756 |
| 2014/0365828 A1 | 12/2014 | Jiang et al. | |
| 2015/0066814 A1 | 3/2015 | Allen et al. | |

OTHER PUBLICATIONS

Zhong et al, "Topology Map Displays of Cloud Computing Resources"; PCT/CN2015/090177; WO 2017/ 049439; International Filing Date: Sep. 21, 2015 (Year: 2015).*

* cited by examiner

*Primary Examiner* — Mohsen Almani
(74) *Attorney, Agent, or Firm* — Winstead PC

(57) ABSTRACT

In one embodiment, a method includes receiving logfile data, parsing the logfile data into parsed data elements and acquiring at least one contextual data element in relation to the parsed data elements. The method further includes structuring the parsed data elements and the at least one contextual data element as instances of a multirepresentational time-series log entry. In addition, the method includes publishing real-time time-series performance data and determining a user viewing context. Furthermore, the method includes automatically correlating the user viewing context to at least one dimension. Additionally, the method includes filtering the log-entry instances by the at least one dimension to yield filtered log-entry instances. Also, the method includes pivoting the filtered log-entry instances on one or more dimensions, the pivoting yielding pivoted data. In addition, the method includes publishing the pivoted data to a user interface.

20 Claims, 8 Drawing Sheets

TOP 5 CPU PROCESSES IN HOST1

| PROCESS | UTILIZATION | LOGTIPS |
|---|---|---|
| PHP.EXE | 95% | VIEW |
| CHROME.EXE | 1% | |
| FTP.EXE | 1% | |
| WORD.EXE | 0.5% | |
| NOTEPAD.EXE | 0.5% | |

PERFORMANCE TIPS FROM LOG

PHP.EXE IN HOST1 REACHES A HIGH CPU UTILIZATION, BELOW ARE SOME ANALYSIS FROM LOG SEVERITY LEVEL AND TOP 5 MESSAGE PATTERN DIMENSIONS

| SEVERITY | MESSAGE PATTERN | COUNT |
|---|---|---|
| ERROR | - | 0 |
| WARN | THERE ARE <?> AMOUNT OF ITEMS, EXCEED 10 THOUSANDS, IT MAY TAKE A LONG TIME TO LOOP THEM. | 50 |
| WARN | OBJECT USER ID <?> IS EXPIRED | 4 |
| INFO | - | 0 |
| DEBUG | - | 0 |

| | AppServer1 | AppServer2 | AppServer3 | AppServer4 | AppServer5 |
|---|---|---|---|---|---|
| com.sample.InvalidInputException | 0 | 1 | 1 | 0 | 1 |
| com.sample.SessionExpiredException | 0 | 5 | 0 | 1 | 0 |
| javax.xml.xpath.XPathException | 1 | 2 | 1 | 0 | 2 |
| com.xml.XMLStreamException | 0 | 4 | 0 | 0 | 1 |
| java.net.SocketException | 10 | 15 | 12 | 6 | 13 |
| java.io.IOException | 0 | 3 | 1 | 0 | 0 |
| java.lang.NullPointException | 0 | 5 | 2 | 0 | 2 |

FIG. 6

SYSTEMS AND METHODS FOR TRANSFORMATION AND ANALYSIS OF LOGFILE DATA

BACKGROUND

Technical Field

The present disclosure relates generally to performance monitoring and more particularly, but not by way of limitation, to systems and methods for transformation and analysis of logfile data.

History of Related Art

In information technology (IT) management, real-time performance data may be collected from numerous monitored systems. Logfile data can provide additional information about certain events that occur on the monitored systems. However, in general, it is not easy to discover what logfile data is relevant to what performance data.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes receiving logfile data comprising information related to computer-performance events, parsing the logfile data into parsed data elements and acquiring at least one contextual data element in relation to the parsed data elements. The method further includes structuring the parsed data elements and the at least one contextual data element as instances of a multirepresentational time-series log entry, the multirepresentational time-series log entry comprising a plurality of dimensions. In addition, the method includes publishing real-time time-series performance data related to a monitored system and determining a user viewing context in relation to the real-time time-series performance data. Furthermore, the method includes automatically correlating the user viewing context to at least one dimension of the plurality of dimensions. Additionally, the method includes, responsive to the automatically correlating, filtering the log-entry instances by the at least one dimension to yield filtered log-entry instances. Also, the method includes pivoting the filtered log-entry instances on one or more dimensions, the pivoting yielding pivoted data. In addition, the method includes publishing the pivoted data to a user interface.

In one embodiment, an information handling system includes a processor. The processor is operable to implement a method. The method includes receiving logfile data comprising information related to computer-performance events, parsing the logfile data into parsed data elements and acquiring at least one contextual data element in relation to the parsed data elements. The method further includes structuring the parsed data elements and the at least one contextual data element as instances of a multirepresentational time-series log entry, the multirepresentational time-series log entry comprising a plurality of dimensions. In addition, the method includes publishing real-time time-series performance data related to a monitored system and determining a user viewing context in relation to the real-time time-series performance data. Furthermore, the method includes automatically correlating the user viewing context to at least one dimension of the plurality of dimensions. Additionally, the method includes, responsive to the automatically correlating, filtering the log-entry instances by the at least one dimension to yield filtered log-entry instances. Also, the method includes pivoting the filtered log-entry instances on one or more dimensions, the pivoting yielding pivoted data. In addition, the method includes publishing the pivoted data to a user interface.

In one embodiment, a computer-program product includes a non-transitory computer-usable medium having computer-readable program code embodied therein. The computer-readable program code is adapted to be executed to implement a method. The method includes receiving logfile data comprising information related to computer-performance events, parsing the logfile data into parsed data elements and acquiring at least one contextual data element in relation to the parsed data elements. The method further includes structuring the parsed data elements and the at least one contextual data element as instances of a multirepresentational time-series log entry, the multirepresentational time-series log entry comprising a plurality of dimensions. In addition, the method includes publishing real-time time-series performance data related to a monitored system and determining a user viewing context in relation to the real-time time-series performance data. Furthermore, the method includes automatically correlating the user viewing context to at least one dimension of the plurality of dimensions. Additionally, the method includes, responsive to the automatically correlating, filtering the log-entry instances by the at least one dimension to yield filtered log-entry instances. Also, the method includes pivoting the filtered log-entry instances on one or more dimensions, the pivoting yielding pivoted data. In addition, the method includes publishing the pivoted data to a user interface.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIGS. 6-8 illustrate example results of utilizing a process such as the process of FIG. 5.

DETAILED DESCRIPTION

Logfile data can be important to diagnose Information Technology (IT) problems and perform business analysis. When the size of an IT environment increases, so does the size of logfile data repositories. Given huge volume of logfile data, it is difficult for users such as administrators to analyze logfile data efficiently. One way to approach this problem might be for administrators to keyword search the logfile data. However, in most cases, it is not known what keywords should be used to search the logfile data.

The present disclosure describes examples of transforming logfile data into instances of multirepresentational time-series log entries. In various embodiments, instance of multirepresentational time-series log entries can be filtered and pivoted on dimensions based on real-time performance data that is being viewed. In addition, in some embodiments, resultant pivoted data can be published to administrators.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
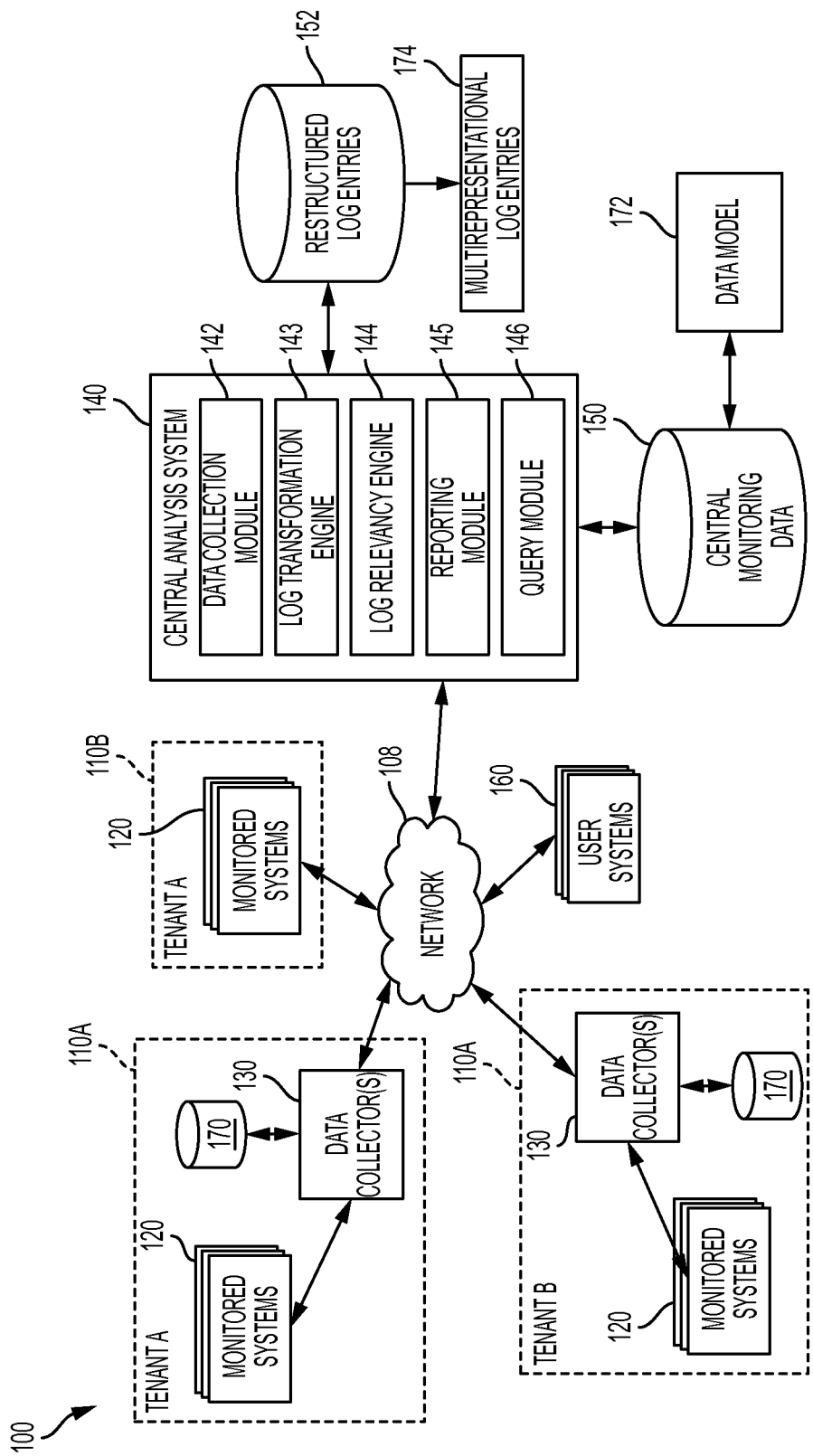
FIG. 1 illustrates an example computing environment.

FIG. 1 illustrates an example computing environment 100 for implementing a central analysis system 140. In the computing environment 100, tenant systems 110 connect to the central analysis system 140 over a network 108, which may be a private network, a public network, a local or wide area network, the Internet, combinations of the same, or the like. Each of the tenant systems 110 can represent an installation of physical and/or virtual computing infrastructure. In general, the tenant systems 110 can provide various types of monitoring data to the central analysis system 140, including, for example, performance data (e.g., performance metrics) and system configuration data.

The tenant systems 110 shown can be owned or operated by the same or different entities. For example, two of the tenant systems 110 installed in separate locations are shown as owned or operated by "Tenant A," while another system 110 is owned or operated by a different tenant, "Tenant B."

Tenants A and B can represent customers (e.g., entities such as companies or individuals) of an operator of the central analysis system 140. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more monitored systems 120. The monitored systems 120 can include physical and/or virtual computing devices, such as physical machines and/or virtual machines. For instance, a monitored system 110 may include any of the following: an information handling system, a virtual machine, server, web server, application server, database, application, processor, memory, hard drive or other storage device, peripheral, software component, database tables, tablespaces in a database, application tiers, network switches or other network hardware, combinations of the same or the like. Any given tenant system 110 can include from one to several monitored systems 120. For example, a tenant system 110 can represent an entire data center having hundreds or even thousands of monitored systems 120.

Data collectors 130 and local data stores 170 can be provided in some or all of the tenant systems 110. In the depicted embodiment, data collectors 130 and local data stores 170 are shown in a pair of the tenant systems 110A. No data collector 130 or local data store 170 is provided in one of the tenant systems 110B, which tenant can be an example of a data collection module 142 of the central analysis system 140 in some cases directly collecting monitoring data from the monitored systems 120. In some embodiments, the tenant systems 110 can additionally maintain a cache (not explicitly shown) for storing metrics derived from data elements in the local data store 170. In these embodiments, the tenant systems 110, or the data collectors 130, could be configured to periodically compute the derived metrics and store in the cache.

The data collectors 130 can be software and/or hardware agents, appliances, or the like that collect monitoring data about the monitored systems 120. This monitoring data can include time-series data related to the performance of physical and/or software components (including virtual components), such as performance related to any of the monitored systems 120 described above. The monitoring data can also include information about attributes, characteristics, or properties of the monitored systems 120, such as the number of processors in each host device, memory or storage capacity, hardware or software specifications, virtual machine characteristics, and so forth. The data collectors 130 can collect this monitoring data in real-time, periodically, e.g., according to a schedule, on-demand, or a combination of the same, and store the monitoring data in the local data stores 170. In some tenant system 110 installations having many monitored systems 120, one or more management servers (not shown) can manage data collection of a plurality of data collectors 130.

As mentioned above, the data collectors 130 can store the collected monitoring data in the local data stores 170. In addition, the data collectors 130 can provide the collected monitoring data to the central analysis system 140 upon request, or, in some cases, as a live stream. Other tenant systems 110 that do not have local data collectors 130, such as the tenant system 110B, can provide monitoring data directly to the central analysis system 140. The central analysis system 140, or more specifically the data collection module 142, can access this data remotely by querying libraries or APIs of the tenant systems 110B, thereby replacing the functionality of the data collectors 130 in some embodiments. More generally, in other embodiments, local data collectors 130 or other agents may be omitted, or each tenant system 110 can include one or more data collectors 130.

For smaller computing environments, the central analysis system 140 can be implemented as a single management server. Alternatively, the central analysis system 140 can be implemented in a plurality of virtual or physical servers, which may or may not be geographically co-located. For example, the central analysis system 140 and/or other aspects of the computing environment 100 may be hosted in a cloud-based hosting service such as the Azure™ service provided by Microsoft® or the EC2™ platform provided by Amazon®.

Example implementations for collecting data using agents and management servers is described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent") and U.S. application Ser. No. 12/370,399 ("the '399 application"). The central analysis system 140 and data collectors 130 can implement some or all of the features described in the '245 patent and the '399 application.

In certain embodiments, the central data store 150 implements a data model 172. The data model 172 can be, for example, a topology model that represents computer systems and components as interrelated topology objects. Examples of topology models are described in the '245 patent and the '399 application. The data model 172 typically provides a common representation of, and a single point of reference for, monitoring data collected in the computing environment 100. For example, the data model 172 can specify, inter alia, a structure of each element of monitoring data the central analysis system 140 is operable to receive.

In the depicted embodiment, the central analysis system 140 includes the data collection module 142, a log transformation engine 143, a log relevancy engine 144, a reporting module 145, and a query module 146. Each of these components can be implemented with hardware and/or software, including (optionally) virtual machines. In an example, the central analysis system 140 can be implemented as a single management server. In another example, the central analysis system 140 can be implemented in a plurality of virtual or physical servers, which may or may not be geographically co-located. For instance, the central analysis system 140 and/or other aspects of the computing environment 100 may be hosted in a cloud-based hosting service such as the Azure™ service provided by Microsoft® or the EC2™ platform provided by Amazon®.

In addition to the above, the monitored systems 120 can each be a source of logfile data. In general, logfile data can include records of computer-performance events that occur in the monitored systems 120. In general, computer-performance events can be detected occurrences or actions that deviate from what is expected, merit special handling, and/or warrant tracking. For example, in various cases, events can include errors, exceptions, completed transactions, combinations of same and/or the like.

In certain embodiments, the log transformation engine 143 can retrieve logfile data from one or more of the monitored systems 120 and transform it into instances of one or more multirepresentational time-series log entries 174. The instances of the multirepresentational time-series log entries 174 can be stored in a data store 152. The multirepresentational time-series log entries 174 can be restructured log formats that are defined or established for particular types of logs. In an example, distinct multirepresentational time-series log entries can be defined for application-server logs, web-application logs, JAVA garbage-collection logs, hypertext transfer protocol (HTTP) access logs, etc.

Generally, each of the multirepresentational time-series log entries 174 can include a mapping of attributes, or data fields, to particular data fields of corresponding logfile data. More particularly, each multirepresentational time-series log entry of the multirepresentational time-series log entries 174 can specify a plurality of dimensions, with each dimension providing a representation or viewing angle of the data encapsulated in a log-entry instance. Each dimension can be a data field, or combination of data fields, on which the data of a given multirepresentational log-entry instance can be dynamically pivoted and rearranged. For example, instances of the multirepresentational time-series log entries 174 can be stored in various forms of flat tables, pivot tables, etc. Examples of multirepresentational time-series log entries will be described in relation to FIG. 3. Example operation of the log transformation engine 143 will be described in greater detail with respect to FIG. 4.

Additionally, the multirepresentational time-series log entries 174 can each specify, as one of its data fields, a timing data field to indicate when a described computer-performance event occurred. The timing data field can be, for example, a timestamp. The timing data field enables logfile data, when restructured as described herein, to be treated as time-series data. Advantageously, in certain embodiments, timing data fields enable instances of the multirepresentational time-series log entries 174 to be readily correlated with real-time time-series performance data.

The log relevancy engine 144 can be a software and/or hardware component operable to automatically identify, based on a performance input, relevant filter conditions for instances of the multirepresentational time-series log entries 174 stored in the data store 152. For example, in various cases, the log relevancy engine 144 can determine relevant log entries of the multirepresentational time-series log entries 174, relevant dimensions of those relevant multirepresentational time-series log entries 174, other filter conditions (e.g., period of time), combinations of same and/or the like. The log relevancy engine 144 can use the filter conditions to retrieve and return, to a requestor, log-entry instances that are deemed relevant to the performance input. In addition, the log relevancy engine 144 can dynamically pivot the log-entry instances on one or more of the dimensions (sometimes referred to herein as pivot dimensions) to yield a pivoted data set. For example, the log relevancy engine 144 can aggregate the log-entry instances by a particular pivot dimension (e.g., an event severity dimension that has possible values of "mild," "moderate" and "severe"). In this fashion, log-entry instances that have a same value (or same range of values) for the pivot dimension can be shown collectively. Thus, it can more easily be seen how values of other data elements, in the aggregate, change based on different values (or ranges of values) for the pivot dimension.

In certain embodiments, the log relevancy engine 144 can interoperate with the reporting module 145 to automatically provide the log-entry instances in relation to a performance report or dashboard. In some embodiments, the log relevancy engine 144 can be part of the reporting module 145. Example operation of the log relevancy engine 144 will be described in greater detail with respect to FIGS. 5-8.

The reporting module 145 can generate regular or on-demand reports related to the monitoring data. In various cases, these reports can provide a snapshot of some or all of the monitored systems 120. The reporting module 145 typically accesses the monitoring data via the query module 146. The reporting module 145 can publish reports or other generated information, for example, to a web page, dashboard, and/or the like. For example, in some embodiments, the reporting module 145 can generate and/or cause to be displayed data generated by the log relevancy engine 144. The query module 146 can generate and execute a query of the central data store 150. In various cases, the query module 146 can be triggered by and work in conjunction with the reporting module 145.

The web page, user dashboard or other user interface(s) output, for example, by the reporting module 145, can be accessed by users of user systems 160. The query module 146 can also provide a user interface, for instance, that allows the users of the user systems 160 to obtain customized data related to any data maintained by the central data store 150. The user systems 160 can include any type of computing device, including information handling systems such as desktops, laptops, tablets, smartphones, PDAs, to name a few. The user systems 160 can be operated by users associated with the tenants or by other users.

Figure 2:
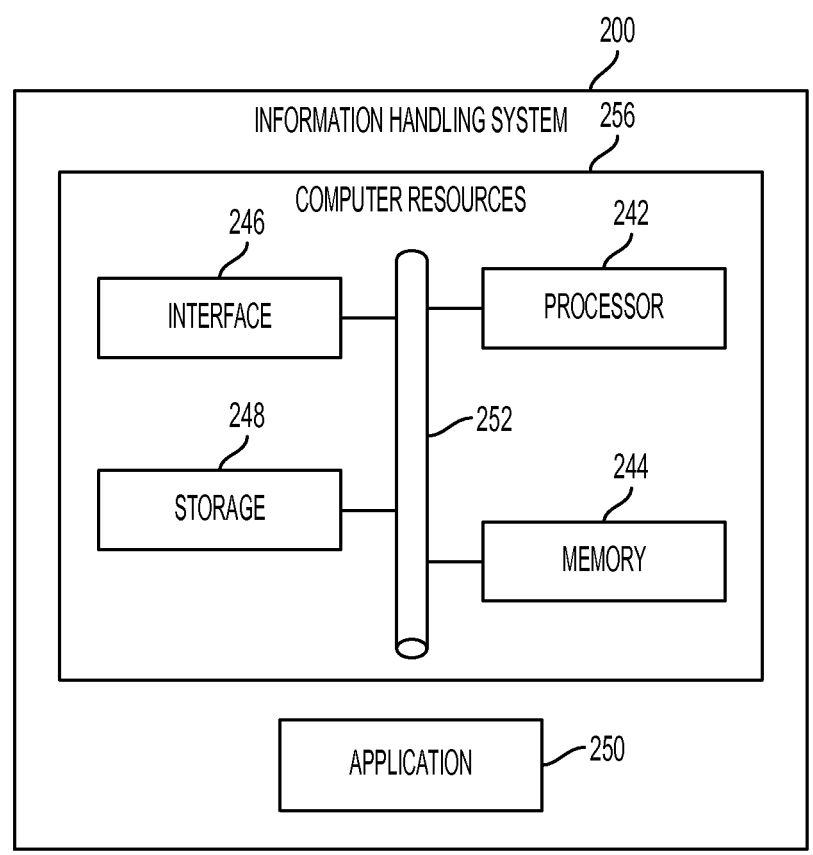
FIG. 2 illustrates an example of an information handling system.

FIG. 2 illustrates an example of an information handling system 200 that, in some cases, can be representative, for example, of the tenant systems 110, the monitored systems 120, the data collectors 130, the user systems 160 and/or the central analysis system 140 of FIG. 1. The information handling system 200 includes an application 250 operable to execute on computer resources 256. The application 250 can be similar, for example, to the data collection module 142, the reporting module 145, the query module 146 and, in some cases, the data collectors 130. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM.

In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
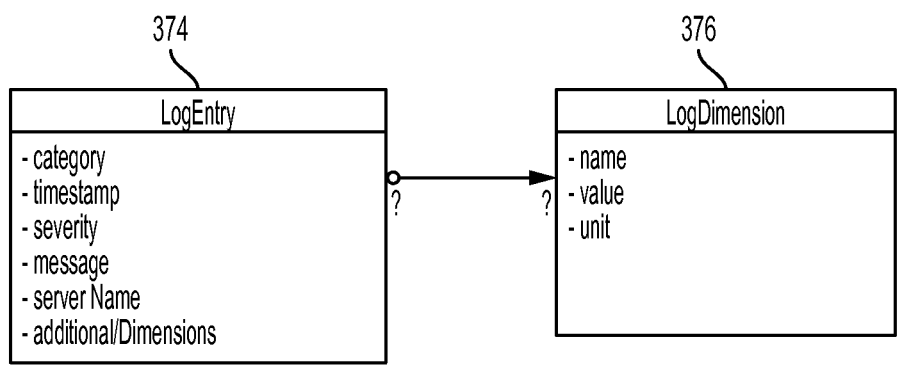
FIG. 3 illustrates an example of a multidimensional log entry.

FIG. 3 illustrates an example of a multidimensional log entry 374. In the illustrated embodiment, the multirepresentational time-series log entry 374 includes one or more dimensions 376. Each instance of the log entry 374 can include log-entry attributes such as, for example, a log category, timestamp, event severity, message, server name associated with the computer-performance event, combinations of same and/or the like. In various cases, some or all attributes of the log entry 374 can correspond to a dimension of the dimensions 376.

In an example, the dimensions 376 can include owner dimensions. In general, owner dimensions can indicate a source, or originator, of particular logfile data. In various cases, an owner dimension of particular logfile data can indicate an application name for an application log, a site name for a web server, a physical server name, a virtual machine name/ID, a process name/ID, a thread name/ID, combinations of same and/or the like. Table 1 below provides examples of owner dimensions.

TABLE 1

EXAMPLE OWNER DIMENSIONS

Application name
Server name
Virtual machine name

In another example, the dimensions 376 can include generic dimensions. Generic dimensions can include general metadata about a logged computer-performance event. Table 2 below provides examples of generic dimensions.

TABLE 2

EXAMPLE GENERIC DIMENSIONS

Timestamp
Severity level of an event
Log message pattern
Log message itself

In yet another example, the dimensions 376 can include domain-specific dimensions. In general, domain-specific dimensions can be specific to a logfile category or type. Tables 3, 4, 5 and 6 below list example dimensions for application server logs, web application server logs, garbage-collection logs and HTTP access logs, respectively.

TABLE 3

EXAMPLE DIMENSIONS FOR
APPLICATION SERVER LOGS

Exception package name
Exception class name
Exception message

TABLE 4

EXAMPLE DIMENSIONS FOR
WEB APPLICATION SERVER LOGS

Request Uniform Resource Identifier (URI)

TABLE 5

EXAMPLE DIMENSIONS FOR
JAVA GARBAGE-COLLECTION LOGS

Garbage-collection generation
Garbage-collection efficiency
Size before garbage collection
Size after garbage collection
Garbage collection time used.

TABLE 6

EXAMPLE DIMENSIONS
FOR HTTP ACCESS LOGS

Figure 4:
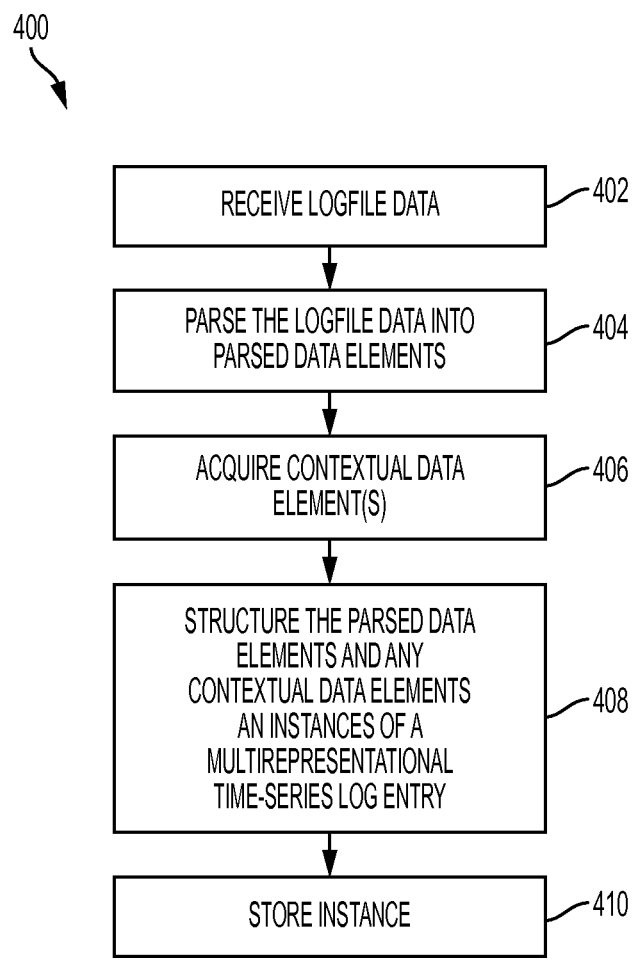
FIG. 4 illustrates an example of a process for transforming logfile data.

Response code
Browser type
Request uniform resource identifier (URI)
Remote Internet Protocol (IP) address
Content length FIG. 4 illustrates an example of a process 400 for transforming logfile data. For example, the process 400, in whole or in part, can be implemented by one or more of the central analysis system 140, the data collection module 142, the log transformation engine 143, the log relevancy engine 144, the reporting module 145, and/or the query module 146. The process 400 can also be performed generally by the computing environment 100. Although any number of systems, in whole or in part, can implement the process 400, to simplify discussion, the process 400 will be described in relation to specific systems or subsystems of the computing environment 100.

At block 402, the log transformation engine 143 receives logfile data that includes information related to computer-performance events on one or more of the monitored systems 120. The logfile data can originate from a log such as, for example, logs of any of the types or categories described above. In various cases, the logfile data can be retrieved or pulled by the log transformation engine 143, pushed to the log transformation engine 143 (e.g., by a component or agent on the monitored systems or one of the data collectors 120), combinations of same and/or the like.

At block 404, the log transformation engine 143 parses the logfile data into parsed data elements. For example, each data element contained in the logfile data can be identified and parsed out as a data element. The parsing can be based on a mapping of data fields to data elements contained in a corresponding multirepresentational time-series log entry of the multirepresentational time-series log entries 174. As described in greater detail above, some or all of the parsed data elements can correspond to dimensions such as, for example, the dimensions 376 of FIG. 3.

At block 406, the log transformation engine 143 acquires contextual data elements. In some embodiments, contextual data elements can be data elements that are not contained in the received logfile data but are obtainable from a different source. For example, in certain embodiments, the received logfile data might not contain data elements corresponding to owner dimensions of the type described above. According to this example, the log transformation engine 143 can determine an origin of the logfile data, for example, from log metadata that indicates an application or other component which writes to a corresponding log. Some or all of the contextual data elements can correspond to dimensions such as, for example, the dimensions 376 of FIG. 3. In some embodiments, the block 406 can be omitted. For example, in some implementations, there may not be a need to acquire any data other than what is contained in a given log.

At block 408, the log transformation engine 143 structures the parsed data elements and any contextual data elements as one or more instances of a corresponding multirepresentational time-series log entry of the multirepresentational time-series log entries 174. In certain embodiments, the block 408 results in a restructured log entry that includes a timing data field and that can be pivoted on any of the dimensions defined for the corresponding multirepresentational time-series log entry. At block 410, the instances resulting from block 408 can be stored in the data store 152 or other memory.

Figure 5:
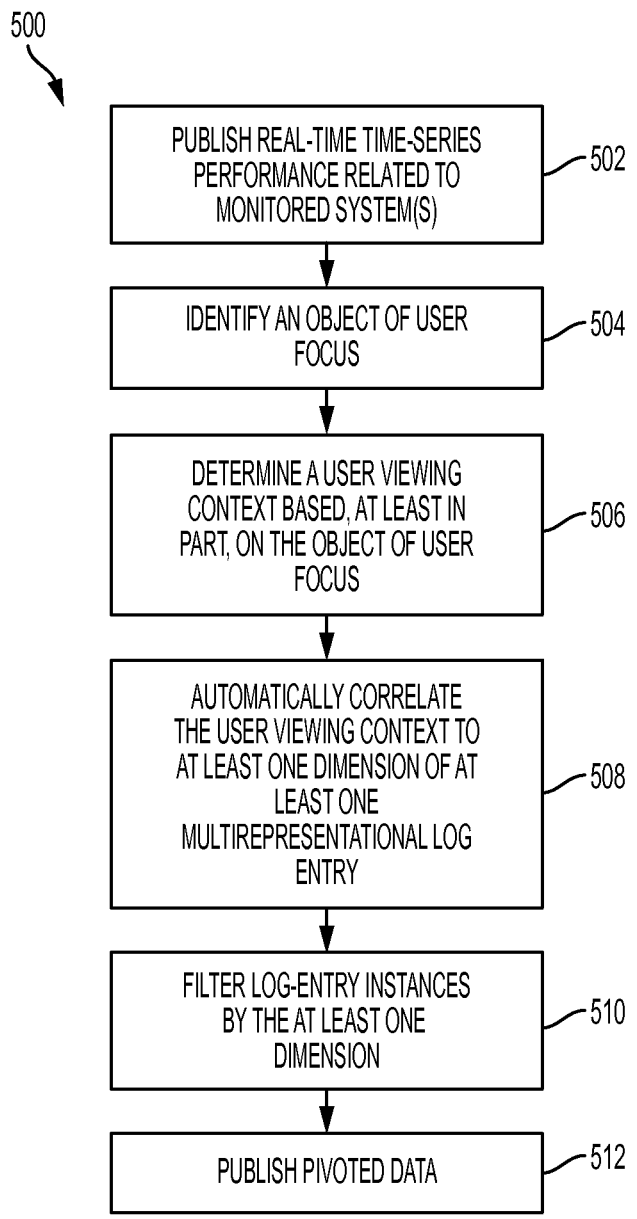
FIG. 5 illustrates an example of a process for pivoting transformed logfile data.

FIG. 5 illustrates an example of a process 500 for pivoting transformed logfile data. For example, the process 500, in whole or in part, can be implemented by one or more of the central analysis system 140, the data collection module 142, the log transformation engine 143, the log relevancy engine 144, the reporting module 145, and/or the query module 146. The process 500 can also be performed generally by the computing environment 100. Although any number of systems, in whole or in part, can implement the process 500, to simplify discussion, the process 500 will be described in relation to specific systems or subsystems of the computing environment 100.

At block 502, the reporting module 145 publishes real-time time-series performance data related to the monitored systems 120. In various cases, the real-time time-series performance data can relate to information or data collected via the data collectors 130 and/or the data collection module 142.

At block 504, the reporting module 145 determines a user viewing context for the published real-time time-series performance data. In general, the user viewing context characterizes what information or data is of interest to a user. In some embodiments, the user viewing context can be supplied by the user. For example, the reporting module 145 can receive an explicit indication from the user that exceptions by an application server in a named application over a specified period of time are of interest. Additionally, or alternatively, the reporting module 145 can automatically infer the user viewing context based at least partly on information or data currently being presented to the user. For example, a user may be viewing information about failed transactions on a specified application over a specified time period, or have requested performance data related to a particular infrastructure component such as, for example, an application server. In such cases, information identifying the application or infrastructure component can be an attribute of the user viewing context. In some embodiments, the user viewing context can be specified in terms of topology objects from topology models as described in the '245 patent and the '399 application.

At block 506, the log relevancy engine 144 automatically correlates the user viewing context to at least one dimension of at least one multirepresentational time-series log entry of the multirepresentational time-series log entries 174. For example, a user viewing context may have one or more attributes such as, for example, a particular application, a particular component such as a database server or an application server, a range of time, etc. In certain embodiments, the block 506 can include the log relevancy engine 144 attempting to match each attribute of the user viewing context to a dimension of multirepresentational time-series log entries. For example, the log relevancy engine 144 can match a range of time of the user viewing context with a timing data field of the multirepresentational time-series log entries.

At block 508, the log relevancy engine 144 automatically filters log-entry instances of the at least one multirepresentational time-series log entry by the at least one dimension, including any time-period limitations (e.g., the range of time of the user viewing context). At block 510, the log relevancy engine 144 can pivot the filtered log-entry instances on one or more dimensions. For example, the log relevancy engine 144 can aggregate a dimension by a particular value or ranges of values and determine aggregate values of other data fields for the aggregated dimension. Examples of pivoting will be described in greater detail with respect to FIGS. 6-8. In some cases, the log relevancy engine 144 can generate a visualization of the pivoted data such as, for example, a graph, table or chart. At block 512, the reporting module 145 publishes the pivoted data (and/or a visualization thereof) to a user interface. In some cases, the pivoted data (and/or a visualization thereof) can be presented in relation to the real-time time-series performance data published at block 502.

Figure 7:
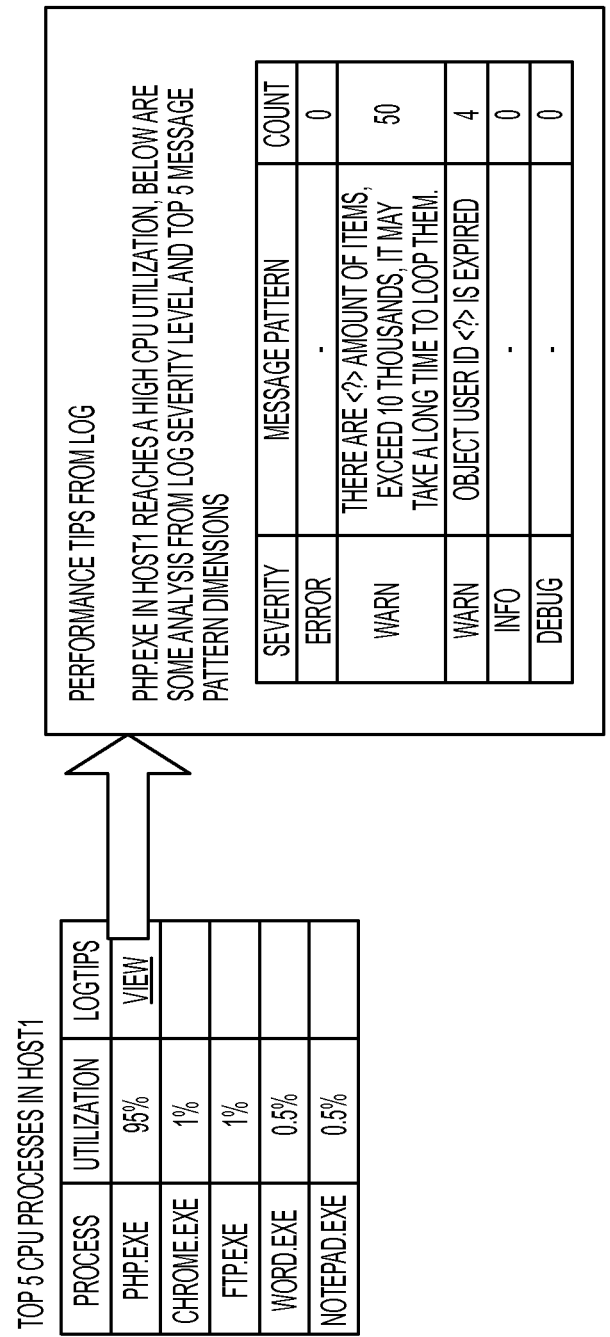
Figure 8:
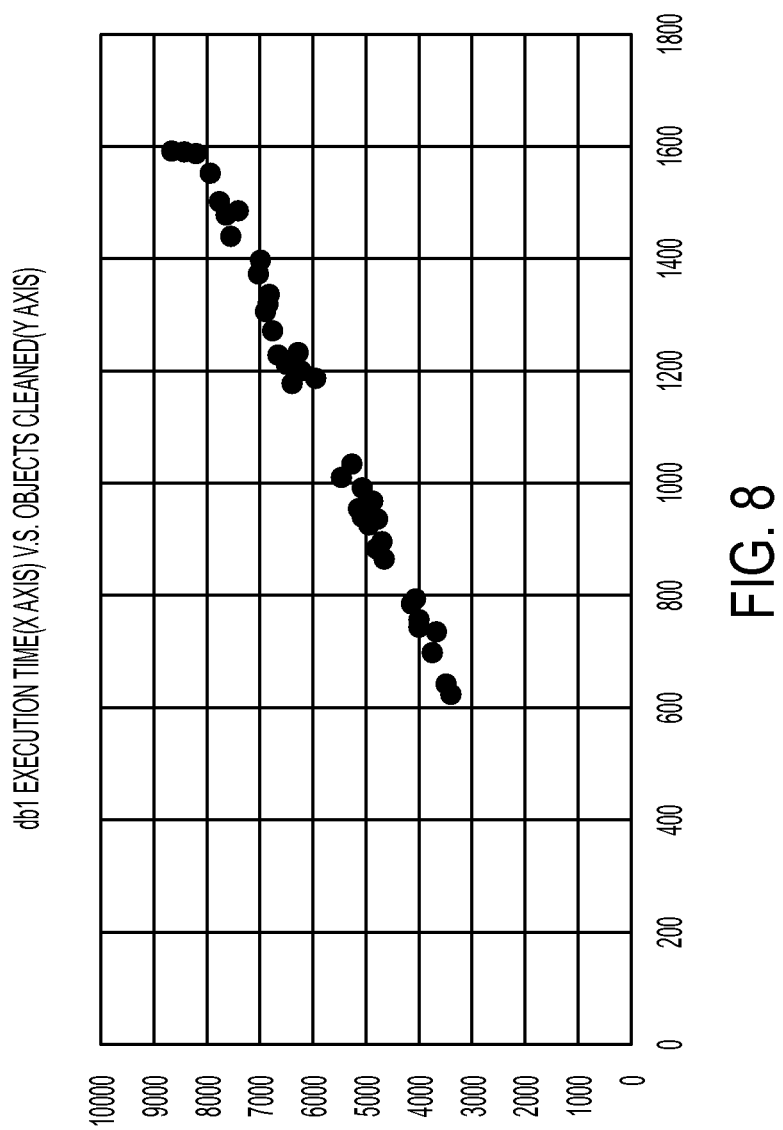

FIGS. 6-8 illustrate example results of utilizing a process such as the process 500 of FIG. 5. In particular, FIG. 6 relates to an example implementation of an end-user experience-monitoring system. Consider an example scenario in which an administrator has discovered that application "Booking" has many failed transactions. According to this example, the "Booking" application is deployed in an application cluster having five nodes.

In certain embodiments, the administrator may want to identify what kinds of exceptions are associated with a "Booking" application and drill down into exception details. According to this example, a user viewing context can be determined that includes an exception dimension, an application-server dimension, and an owner dimension which specifically identifies an application name of the "Booking" application. In that way, the log relevancy engine 144 can filter out the exception dimension and the application-server dimension of log-entry instances that have the application-name dimension value of "Booking." In the illustrated embodiment, the filtered data can be pivoted on the exception dimension and, thereafter, a data visualization such as a heat map can be generated and presented. As illustrated in FIG. 6, the heat map can show a density of exceptions by application server. The administrator could use the heat map to discover which application server(s) and/or which exception(s) have a greatest likelihood of being the cause of transaction failures.

FIG. 7 relates to an example of infrastructure host monitoring. Consider an example scenario in which an administrator is viewing a top-N list of processes for CPU utilization. In certain embodiments, the log relevancy engine 144 can discover, or infer, a user viewing context that includes a server name dimension, each process name/ID on the top-N list and a time period to which the top-N list relates. Using the user viewing context, the log relevancy engine 144 can filter log-entry instances to obtain messages involving that server name and one or more of the process names/IDs over the time period. For example, if a user hovers over or selects a process name/ID (e.g., "php.exe"), the log relevancy engine 144 can further limit the user viewing context to the hovered over or selected process name/ID.

In the illustrated example of FIG. 7, the administrator has selected the "php.exe" process. In response to that selection and corresponding user viewing context, the log relevancy engine 144 can obtain log-entry instances that include a message-pattern dimension and an event severity-level dimension for the "php.exe" process. According to this example, the log relevancy engine 144 discovers that there are many messages having a "WARN" level of severity for the user viewing context. In the illustrated embodiment, the log-entry instances, as filtered, can be pivoted on the message-pattern dimension and displayed. Message pattern can be determined using various algorithms such as, for example, a longest common subsequence (LCS) algorithm. In the example of FIG. 7, the top message pattern is "there are <?> amount of items, exceed 10 thousands, it may take a long time to loop them."

FIG. 8 relates to an example of troubleshooting database execution time in a monitoring system. Consider an example scenario in which an administrator discovers that database "db1" does not have a stable execution time. In this example scenario, the administrator may suspect that the unstable execution time may relate to a backend database-cleaning job. According to this example, a user viewing context could be specified, or inferred, which identifies database "db1" and requests logfile data for objects cleaned. The chart shown in FIG. 8 is an example resulting chart. By plotting the database "db1" execution time against a log dimension of "objects cleaned by the job," correlations therebetween can be identified. In the example illustration of FIG. 8, the points are aligned which can mean a high correlation between database "db1" execution time and the number of cleaned objects.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
 collecting real-time time-series performance data from a monitored system;
 storing the real-time time-series performance data in a first data store that implements a topology model, the topology model representing systems and components as interrelated topology objects;
 retrieving logfile data from a logfile data repository of the monitored system, the logfile data comprising records of computer-performance events that have occurred on the monitored system;
 parsing the logfile data into parsed data elements that correspond to a plurality of dimensions of a multirepresentational time-series log entry, the multirepresentational time-series log entry comprising a timing data field;
 acquiring at least one contextual data element in relation to the parsed data elements that is not contained in the logfile data;
 structuring the parsed data elements and the at least one contextual data element as instances of the multirepresentational time-series log entry, the instances each including, in the timing data field, a timestamp of a given computer-performance event, the instances thereby enabling the logfile data to be treated as time-series data;
 storing the instances of the multirepresentational time-series log entry in a second data store that is separate from the first data store;
 publishing performance data comprising at least a portion of the stored real-time time-series performance data in the first data store to a user interface;
 determining a user viewing context for the published performance data in the user interface, the user viewing context comprising selected attributes of the published performance data, the selected attributes comprising a range of time;

automatically correlating the selected attributes of the user viewing context to at least one dimension of the plurality of dimensions of the stored instances of the multirepresentational log entry in the second data store, the automatically correlating comprising matching the range of time of the user viewing context with the timing data field of the multirepresentational time-series log entry;

responsive to the automatically correlating, filtering the log-entry instances by the at least one dimension to yield filtered log-entry instances;

pivoting the filtered log-entry instances on one or more dimensions of the plurality of dimensions, the pivoting yielding pivoted data; and publishing the pivoted data to the user interface.

2. The method of claim 1, wherein the acquiring comprises determining an origin of the logfile data from metadata that indicates a component which writes to a corresponding log.

3. The method of claim 1, wherein the logfile data comprises an application-server log.

4. The method of claim 1, wherein the automatically correlating comprises matching an application name specified in the published performance data to an application-name value of the at least one dimension.

5. The method of claim 1, wherein the parsing is based, at least in part, on a mapping of data fields to data elements contained in the multirepresentational time-series log entry.

6. The method of claim 1, wherein at least a portion of the user viewing context is specified in terms of one or more of the interrelated topology objects from the topology model.

7. The method of claim 1, wherein:
the plurality of dimensions comprise an owner dimension and a domain-specific dimension that includes information specific to a logfile category; and
the at least one dimension corresponds to at least one of the owner dimension and the domain-specific dimension.

8. The method of claim 1, wherein at least a portion of the user viewing context is explicitly indicated by a user.

9. The method of claim 8, wherein the automatically filtering comprises filtering the log-entry instances by the range of time of the user viewing context.

10. The method of claim 1, wherein the plurality of dimensions comprise a dimension that indicates a source of the logfile data.

11. The method of claim 1, wherein the plurality of dimensions comprise a dimension that includes information specific to a logfile category.

12. An information handling system comprising a processor, wherein the processor is configured to implement a method comprising:
collecting real-time time-series performance data from a monitored system;
storing the real-time time-series performance data in a first data store that implements a topology model, the topology model representing systems and components as interrelated topology objects;
retrieving logfile data from a logfile data repository of the monitored system, the logfile data comprising records of computer-performance events that have occurred on the monitored system;
parsing the logfile data into parsed data elements that correspond to a plurality of dimensions of a multirepresentational time-series log entry, the multirepresentational time-series log entry comprising a timing data field;
acquiring at least one contextual data element in relation to the parsed data elements that is not contained in the logfile data;
structuring the parsed data elements and the at least one contextual data element as instances of the multirepresentational time-series log entry, the instances each including, in the timing data field, a timestamp of a given computer-performance event, the instances thereby enabling the logfile data to be treated as time-series data;
storing the instances of the multirepresentational time-series log entry in a second data store that is separate from the first data store;
publishing performance data comprising at least a portion of the stored real-time time-series performance data in the first data store to a user interface;
determining a user viewing context for the published performance data in the user interface, the user viewing context comprising selected attributes of the published performance data, the selected attributes comprising a range of time;
automatically correlating the selected attributes of the user viewing context to at least one dimension of the plurality of dimensions of the stored instances of the multirepresentational log entry in the second data store, the automatically correlating comprising matching the range of time of the user viewing context with the timing data field of the multirepresentational time-series log entry;
responsive to the automatically correlating, filtering the log-entry instances by the at least one dimension to yield filtered log-entry instances;
pivoting the filtered log-entry instances on one or more dimensions of the plurality of dimensions, the pivoting yielding pivoted data; and
publishing the pivoted data to the user interface.

13. The information handling system of claim 12, wherein the acquiring comprises determining an origin of the logfile data from metadata that indicates a component which writes to a corresponding log.

14. The information handling system of claim 12, wherein the logfile data comprises an application-server log.

15. The information handling system of claim 12, wherein the automatically correlating comprises matching an application name specified in the published performance data to an application-name value of the at least one dimension.

16. The information handling system of claim 12, wherein the parsing is based, at least in part, on a mapping of data fields to data elements contained in the multirepresentational time-series log entry.

17. The information handling system of claim 12, wherein:
the plurality of dimensions comprise an owner dimension and a domain-specific dimension that includes information specific to a logfile category; and
the at least one dimension corresponds to at least one of the owner dimension and the domain-specific dimension.

18. The information handling system of claim 12, wherein at least a portion of the user viewing context is specified in terms of one or more of the interrelated topology objects from the topology model.

19. The information handling system of claim 18, wherein the automatically filtering comprises filtering the log-entry instances by the range of time of the user viewing context.

20. A computer-program product comprising a non-transitory computer-usable medium having computer-readable program code embodied therein, the computer-readable program code configured to be executed to implement a method comprising:
- collecting real-time time-series performance data from a monitored system;
- storing the real-time time-series performance data in a first data store that implements a topology model, the topology model representing systems and components as interrelated topology objects;
- retrieving logfile data from a logfile data repository of the monitored system, the logfile data comprising records of computer-performance events that have occurred on the monitored system;
- parsing the logfile data into parsed data elements that correspond to a plurality of dimensions of a multirepresentational time-series log entry, the multirepresentational time-series log entry comprising a timing data field;
- acquiring at least one contextual data element in relation to the parsed data elements that is not contained in the logfile data;
- structuring the parsed data elements and the at least one contextual data element as instances of the multirepresentational time-series log entry, the instances each including, in the timing data field, a timestamp of a given computer-performance event, the instances thereby enabling the logfile data to be treated as time-series data;
- storing the instances of the multirepresentational time-series log entry in a second data store that is separate from the first data store;
- publishing performance data comprising at least a portion of the stored real-time time-series performance data in the first data store to a user interface;
- determining a user viewing context for the published performance data in the user interface, the user viewing context comprising selected attributes of the published performance data, the selected attributes comprising a range of time;
- automatically correlating the selected attributes of the user viewing context to at least one dimension of the plurality of dimensions of the stored instances of the multirepresentational log entry in the second data store, the automatically correlating comprising matching the range of time of the user viewing context with the timing data field of the multirepresentational time-series log entry;
- responsive to the automatically correlating, filtering the log-entry instances by the at least one dimension to yield filtered log-entry instances;
- pivoting the filtered log-entry instances on one or more dimensions of the plurality of dimensions, the pivoting yielding pivoted data; and
- publishing the pivoted data to the user interface.

* * * * *